United States Patent [19]

Ashford et al.

[11] Patent Number: 4,977,047

[45] Date of Patent: Dec. 11, 1990

[54] METHOD OF PREPARING A HOLOGRAM

[75] Inventors: Neil F. Ashford, Crewe; Alan Hodgson, Stockport; Peter M. Blum, Altrincham; Stephen R. Postle, Sale, all of England

[73] Assignee: Ilford Limited, Cheshire, England

[21] Appl. No.: 317,661

[22] Filed: Mar. 1, 1989

[30] Foreign Application Priority Data

Mar. 7, 1988 [GB] United Kingdom ................. 8805398

[51] Int. Cl.$^5$ ............................................. G03C 00/00
[52] U.S. Cl. .......................................... 430/2; 430/1; 430/432; 430/493
[58] Field of Search ....................... 430/1, 2, 432, 493, 430/636

[56] References Cited

U.S. PATENT DOCUMENTS

| | | | |
|---|---|---|---|
| 4,769,300 | 9/1988 | Butcher | 430/2 |
| 4,769,301 | 9/1988 | Butcher et al. | 430/2 |
| 4,788,115 | 11/1988 | Long et al. | 430/2 |

Primary Examiner—José Dees
Assistant Examiner—J. Weddington
Attorney, Agent, or Firm—Wenderoth, Lind & Ponack

[57] ABSTRACT

A method of preparing a hologram which is of the silver halide in gelatin binder type which method comprises holographically exposing the holographic material by use of coherent light, developing the holographic image by a chemical process and wherein after development the material is treated with an aqueous solution of an anionic surfactant which comprises at least one alkyl group having at least four carbon atoms, to achieve bathochromic shift in the replay wavelength.

17 Claims, No Drawings

METHOD OF PREPARING A HOLOGRAM

This invention relates to a method of preparing a hologram. In general a hologram will replay using white light reconstruction, at about the wavelength of the coherent light which was used in the exposure to prepare it. However, during the chemical processing of silver halide sensitised holographic material there is usually some shrinkage of the gelatin binder and this causes, in general, the replay wavelength to be shorter than the wavelength of the laser used in the exposure of the material.

Nevertheless sometimes it is desired that the replay wavelength is longer than the wavelength of the laser used in exposing the material. This is because lasers are expensive and it is desirable that the replay wavelength can be increased to produce a different colour replay hologram using only one laser. Further a He:Ne laser is fairly inexpensive and this emits at 633 nm. However, if it is required to copy a hologram prepared using a He:Ne laser it is more efficient to do so using a pulsed ruby laser which emits at 694 nm. Thus it is desirable that a hologram which was made using a He:Ne laser can replay at 694 nm rather than at 633 nm or less.

In the past some attempt has been made to obtain this bathochromic shift in replay wavelength by treating the hologram with tanning developers such as pyrogallol or inorganic gelatin hardening agents such as aluminium salts, but the results have not been satisfactory. Further it has been found impossible to achieve a bathochromic shift to a desired replay wavelength in a reproducible manner.

Other attempts have been made using organic swelling agents such as triethanolamine, but the effect produced by such agents is not permanent, probably due to the volatility of such swelling agents.

We have found a method of preparing a hologram in which the binder is gelatin and which exhibits a permanent and reproducible bathochromic shift in the replay wavelength.

Therefore according to the present invention there is provided a method of preparing a hologram which is of the silver halide in gelatin binder type which method comprises holographically exposing the holographic material by use of coherent light, developing the holographic image by a chemical process and then bleaching the developed silver and prior to, at the same time as or after the bleaching step treating the material with a solution of an anionic surfactant which comprises at least one alkyl group having at least four carbon atoms to achieve a bathochromic shift in the replay wavelength.

However the treatment with the anionic surfactant solution must be after the development step.

Preferably the anionic surfactant comprises at least one alkyl group having at least eight carbon atoms.

By anionic surfactant or surface active agent is meant an anionic compound which has both a hydrophilic and a hydrophobic portion in the molecule and thus which is able to act as a surface active agent.

Preferably the solution of the anionic surfactant is an aqueous solution and most preferably an aqueous solution having a pH below 5.

Several classes of anionic surfactants are known but the preferred classes to use in the process of the present invention are alkyl sulphonates alcohol sulphates, ether sulphates, phosphate esters and sulphosuccinates.

Particularly useful alkyl sulphonates are alkylbenzene sulphonates of the general formula I:

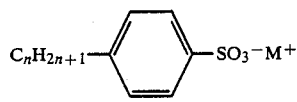

wherein $C_nH_{2n+1}$ is an alkyl group which may be a linear chain or a branched chain, n is at least 4, M is a metal ion, or an ammonium or amine group.

Preferably n is from 8 to 16. Most commonly M is sodium and n is 12.

A commercially available alkyl sulphonate of particular use in the present invention is marketed by Lankro Chemicals Limited under the trade name ARYLAN SC30 which is herein after in the Example which followed is referred to as compound A.

Particularly useful alcohol sulphates are compounds of the general formula II:

$$CH_3(CH_2)_n CH_2OSO_3^-M^+$$

wherein n is at least 3 and M is metal ion or an ammonium or amine group.

Preferably M is sodium and n is at least 8 and most preferably 12.

Compounds of formula II are sometimes more correctly called alkyl sulphates.

A particularly useful compound of formula II is sodium lauryl sulphate which is a commercially available surfactant.

This compound is used in the Example which follows and is referred to therein as compound B. Particularly useful ether sulphates are compounds of the general formula III:

$$CH_3(CH_2)_x CH_2 (O\ CH_2CH_2)_n OSO_3^-M^+$$

and of general formula IV

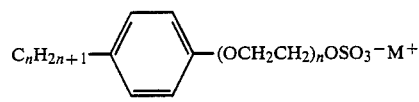

where x is at least 3 and n is at least 2 and M is a metal ion or an ammonium or amine group.

Preferably n is 2 or 3.

The $(CH_2)_x$ alkyl group is preferably a linear group but may be a branched chain. Preferably x is 10 to 12.

A particularly useful compound of formula IV is marketed by Lankro Chemicals Limited under the trade name of PERLANKROL RN 75.

This compound is used in the Example which follows and is referred therein as compound C. Particularly useful phosphate esters are compounds of general formula V:

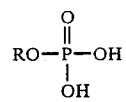

or of the general formula V :

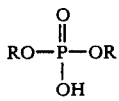

wherein R is the residue of an alcohol, an alkylphenol or an ethoxylate.

Examples of suitable alcohols are alcohols having an alkyl moiety of 6 to 16 carbon atoms which may have a straight or a branched chain.

Examples of suitable alkylphenol are nonylphenol and octylphenol.

Examples of suitable ethoxylate are groups of the formula $(CH_2CH_2O)-H$ wherein n is from 5 to 20.

These phosphate esters are prepared by reacting an alcohol, an alkyl phenol or an ethoxylate with phosphoric acid or phosphorous pentoxide. Usually a mixture of esters of formulae IV and V is obtained A particularly useful alkylphenol polygycol ether phosphate ester which is possibly a mixtures of compounds of formula V and formula V is marketed by REWO Chemicals Limited under the trade name of REWOPHAT E1027.

This compound is referred to in the Example as compound D.

Particularly useful sulphosuccinates are compounds of the general formula VI

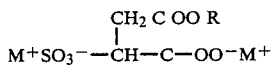

or of the general formula VII:

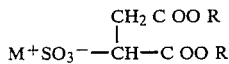

where in the above two formulae $M^+$ is a metal ion and R is an alkyl group, an ethoxylate group or an alkylphenol group each having at least 4 carbon atoms.

Examples of suitable alkyl alkylphenol and ethoxylate groups are the same as given for the compounds of formulae V and VI.

Preferably M is sodium and R is a straight chain alkyl group having from 10 to 12 carbon atoms.

A particularly useful sulphosuccinate is the disodium ethoxylated nonylphenol half ester of sulphosuccinic acid marketed by Cyanamid under the trade name of AEROSOL A.103.

This compound is referred to in the Example as compound E.

It is to be understood that all the commercially available surfactants due to their manner of manufacture have a structure which is difficult to determine with any great accuracy but all the manufacturers state to which general class their named surfactants belong.

The usual processing sequence for holographic material which uses silver halide as the sensitive system is silver halide development using a silver halide developing agent for example hydroquinone, followed by a silver bleaching process.

The silver bleaching step may be an process of removing the developed silver, but which leaves the unexposed silver halide in situ. It is to be understood that the developed silver may be converted to silver halide some of which may remain in the holographic material.

Examples of bleaching techniques are solvent bleaching methods in which the developed silver is removed from the material and rehalogenating bleaching methods, in which the developed silver is converted to silver halide.

After the holographic exposure and development the material is treated with an aqueous solution of the anionic surfactant which may be present in a stop bath between silver halide development and bleaching or in the bleach bath or in a bath in which the material is treated after bleaching.

Preferably the anionic surfactant is present either in an acid stop bath after the development bath or in the bleach bath which is an acid bath. The greatest bathochromic shift is observed when the anionic surfactant is applied to the exposed holographic material in a bath which has a pH less than 5 preferably from 2 to 5.

If the material is washed subsequent to the treatment bath comprising the anionic surfactant sometimes some initial lessening in the bathochromic shift effect is observed, but this lessening does not increase substantially if the material is washed for a longer time.

Preferably the concentration of anionic surfactant in the aqueous treatment bath is from 1 to 5 % weight for weight.

The preferred length of treatment is at least two minutes. A suitable length of treatment is from 2 to 5 minutes.

The following example will serve to illustrate the invention.

EXAMPLE

Samples of holographic material were prepared by coating onto a transparent photographic film base a gelatino silver halide emulsion which was substantially pure silver bromide having a mean crystal size of 0.03 μm at a silver coating weight of 30 mg/dm$^2$. The emulsion was optically sensitised with a red sensitising dye so that it was optimally sensitive to 633 nm the colour of a He:Ne laser.

The material was holographically exposed by a Denisyuk exposure method using a plane mirror plate as an object to yield (after processing) a reflective hologram The material was then developed for 3 minutes in a solution of the following formulation :

| Sodium Sulphite Anhydrous | 30 g |
| Hydroquinone | 10 g |
| Sodium Carbonate | 60 g |
| Water to | 1000 ml |

The material was then transferred to an acetic acid solution stop bath for 30 seconds and then transferred to a rehalogenating bleach bath of the following composition :

| Fe(NH$_4$)EDTA(1.8 m Solution) | 150 ml |
| KBr | 20 g |
| Water to | 1000 ml | until all silver metal has been bleached out which was about 2 minutes.

The samples were then water washed in running water for 2 minutes and transferred to an aqueous bath which consisted of a 2% by weight solution of one of compounds A E for 5 minutes. The pH of the solution is as set forth in the Table.

TABLE

| SOLUTION | pH | Replay nm | Bathochromic Shift |
|---|---|---|---|
| CONTROL | — | 584 | Nil |
| Compound B | 2 | 714 | 130 |
| B | 6.5 | 619 | 35 |
| B | 10 | 605 | 21 |
| Compound E | 2 | 828 | 244 |
| E | 4 | 640 | 58 |
| E | 7 | 588 | 4 |
| E | 10 | 584 | 2 |
| Compound D | 2 | 721 | 137 |
| Compound C | 2 | 737 | 153 |
| Compound A | 2 | 663 | 79 |

Thus all the anionic surfactants A. B, C, D and E cause a bathochromic shift when used in the method of the present invention.

We claim:

1. A method of preparing a -hologram which is of the silver halide in gelatin binder type which method comprises holographically exposing the holographic material by use of coherent light, developing the holographic image by a chemical process and bleaching the developed silver wherein, after development, the material is treated with an aqueous solution of an anionic surfactant selected from the group consisting of an alkyl sulphonate, and alcohol sulphate, an ether sulphate, a phosphate ester and a sulphosuccinate to achieve bathochromic shift in the replay wavelength.

2. A method according to claim 1 wherein the anionic surfactant comprises at least one alkyl group having at least eight carbon atoms.

3. A method according to either claim 1 wherein the solution of the anionic surfactant is an aqueous solution having a pH below 5.

4. A method according to claim 3 wherein the aqueous solution comprises from 1 to 5 % by weight of the anionic surfactant.

5. A method according to claim 3 wherein the aqueous solution which comprises the anionic surfactant is an acid stop bath.

6. A method according to claim 1 wherein the developed holographic material is treated with the solution of the anionic surfactant for at least two minutes.

7. A method according to claim 1 wherein the alkyl sulphonate is an alkylbenzene sulphonate of the general formula I:

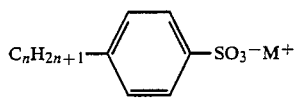

wherein $C_nH_{2n+1}$ is an alkyl group which may be a linear chain or a branched chain, n is at least 4, M is a metal ion, or an ammonium or amine group.

8. A method according to claim 7 wherein M is sodium and n is 12.

9. A method according to claim 7 wherein alcohol sulphate is a compound of the general formula II:
$$CH_3\ CH_2\ OSO_3^-M^+$$

wherein n is at least 3 and M is metal ion or an ammonium or amine group.

10. A method according to claim 9 wherein in M is sodium and n is at least 8.

11. A method according to claim 9 wherein the alcohol sulphate is sodium lauryl sulphate.

12. A method according to claim 1 wherein the ether sulphate is a compound of general formula III:
$$CH_3\ (CH_2)_x\ CH_2\ (O\ CH_2\ CH_2)_n\ OSO_3^-\ M^+$$
or of general formula IV

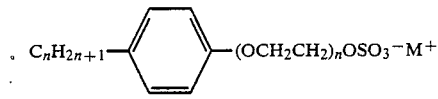

where x is at least 3, and n is at least 2 and M is a metal ion or an ammonium or amine group.

13. A method according to claim 12 wherein n is 2 or 3.

14. A method according to claim 1 wherein the phosphate ester is a compound of general formula V:

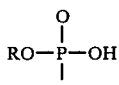

or of the general formula VI:

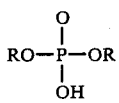

wherein R is the residue of an alcohol, an alkylphenol or an ethoxylate.

15. A method according to claim 1 wherein the sulphosuccinate is a compound of the general formula VII

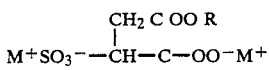

or of the general formula VIII:

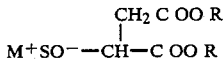

where in the above two formulae $M^+$ is a metal ion and R is an alkyl group, an ethoxylate group or an alkylphenol group each having at least 4 carbon atoms.

16. A method according to claim 15 wherein M is sodium and R is a straight chain alkyl group having 10 to 12 carbon atoms.

17. A method according to claim 15 wherein the sulphosuccinate is the disodium ethoxylated nonylphenol half ester of sulphosuccinic acid.

* * * * *